United States Patent [19]

Sawaoka et al.

[11] 4,394,170

[45] Jul. 19, 1983

[54] COMPOSITE SINTERED COMPACT CONTAINING HIGH DENSITY BORON NITRIDE AND A METHOD OF PRODUCING THE SAME

[75] Inventors: Akira Sawaoka, Yokohama; Masatada Araki, Handa; Shinroku Saito, Yokohama; Tamotsu Akashi, Aichi, all of Japan

[73] Assignee: Nippon Oil and Fats Company, Limited, Tokyo, Japan

[21] Appl. No.: 206,700

[22] Filed: Nov. 14, 1980

[30] Foreign Application Priority Data

Nov. 30, 1979 [JP] Japan .............................. 54/154245

[51] Int. Cl.³ .......................... B22F 3/14; C22C 29/00
[52] U.S. Cl. ...................................... 75/233; 51/307; 51/308; 51/309; 75/238; 75/244; 75/235; 75/226; 501/87; 501/92; 501/96; 501/97; 501/98
[58] Field of Search ................... 501/96; 75/233, 238, 75/244, 0.5 BC; 51/307, 309, 308

[56] References Cited

U.S. PATENT DOCUMENTS

| | | |
|---|---|---|
| 3,852,078 | 12/1974 | Wakatsuki et al. ............... 501/92 |
| 3,892,644 | 7/1975 | Borg et al. ..................... 423/440 |
| 4,008,183 | 2/1977 | Ishii et al. ..................... 75/244 X |
| 4,132,554 | 1/1979 | Saito et al. ..................... 501/96 |
| 4,138,252 | 2/1979 | Vereschagin ..................... 75/244 |
| 4,334,928 | 6/1982 | Hara et al. ..................... 75/238 |

FOREIGN PATENT DOCUMENTS

| | | |
|---|---|---|
| 49-44014 | 4/1974 | Japan . |
| 49-44015 | 4/1974 | Japan . |
| 49-125412 | 11/1974 | Japan . |

*Primary Examiner*—Helen M. McCarthy
*Attorney, Agent, or Firm*—Parkhurst & Oliff

[57] ABSTRACT

A composite sintered compact containing high density boron nitride, which consists of zincblende-type boron nitride, wurtzite-type boron nitride, ceramic material and metal in a specifically limited mixing ratio and has a high abrasion resistance, can be obtained under a relatively mild sintering condition and can be easily worked into a cutting tool.

2 Claims, 2 Drawing Figures

COMPOSITE SINTERED COMPACT CONTAINING HIGH DENSITY BORON NITRIDE AND A METHOD OF PRODUCING THE SAME

BACKGROUND OF THE INVENTION (1) Field of the Invention:

The present invention relates to a novel composite sintered compact containing high density boron nitride, which consists of zincblende-type boron nitride, wurtzite-type boron nitride, ceramic material and metal, is adapted for cutting hard metal and can be easily worked into a cutting tool.

(2) Description of the Prior Art:

High density boron nitride (high pressure phase boron nitride) includes zincblende-type boron nitride (hereinafter, abbreviated as Z-BN) belonging to the cubic system and wurtzite-type boron nitride (hereinafter, abbreviated as W-BN) belonging to the hexagonal system. These zincblende- and wurtzite-type boron nitrides have substantially equal density, which is about 40% higher than the density of graphite-type boron nitride (hereinafter, abbreviated as g-BN), which is low density boron nitride (low pressure phase boron nitride), and have a dense atomic arrangement.

Further, these two high density boron nitrides have high hardness, high thermal conductivity, high chemical stability against transition metals, such as iron, nickel and the like, and other excellent physical properties. Therefore, these boron nitrides are used as a material for tools used in the precision working, and a sintered compact produced by bonding Z-BN crystal grains with metal consisting mainly of cobalt and a sintered compact of a mixture of Z-BN crystal grains and ceramic material, such as titanium nitride, titanium carbide or the like, are commercially sold as a material for cutting tools at present. Further, there are known a sintered compact of a mixture of W-BN and Z-BN, (Japanese Patent Laid-Open Application No. 125,412/74) a sintered compact of a mixture of W-BN and ceramic material, (Japanese Patent Laid-Open Application No. 44,014/74) and a sintered compact of a mixture of W-BN anc metal (Japanese Patent Laid-Open Application No. 44,015/74).

Composite sintered compacts produced from Z-BN and metal or ceramic material have a very high hardness. Therefore, it is very difficult to work the composite sintered compacts themselves into cutting tools. The use of such composite sintered compacts consisting mainly of Z-BN is disadvantageous for commercial purpose when the substances to be cut are not so hard and a cutting tool having a particularly high hardness is not required for cutting the substances.

The inventors have made various investigations with respect to a method of producing a composite sintered compact consisting of a boron nitride mixture of Z-BN and W-BN, and a cermet consisting of ceramic material and metal, and to the properties thereof, and found out that the composite sintered compact exhibits excellent properties in a certain combination of the components.

SUMMARY OF THE INVENTION

The feature of the present invention consists in a composite sintered compact containing high density boron nitride, which consists of 15–60% by volume of high density boron nitride and the remainder being a cermet, said high density boron nitride consisting of 4–16% by volume of Z-BN and 96–84% by volume of W-BN, and said cermet consisting of 70–95% by volume of ceramic material and 30–5% by volume of metal.

Another feature of the present invention consists in a method of producing composite sintered compacts containing high density boron nitride, comprising mixing 15–60% by volume of high density boron nitride powders, which consist of 4–16% by volume of Z-BN powders and 96–84% by volume of W-BN powders, with 85–40% by volume of cermet powders, which consist of 70–95% by volume of ceramic material powders and 30–5% by volume of metal powders; and sintering the resulting mixture under a condition of a pressure of 4–7 GPa (40–70 Kbar) and a temperature of 1,200°–1,800° C.

DESCRIPTION OF THE PREFERRED EMBODIMENTS

As the cermet to be used in combination with W-BN in the present invention, there can be used, for example, TiC-Ni, TiC-Mo, (TiC-Al$_2$O$_3$)-Ni, (TiC-Al$_2$O$_3$)-Mo, TiN-Co, TiB$_2$-Ni and the like. Further as the cermet, use is made of a mixture of at least one ceramic material selected from the group consisting of nitrides, such as aluminum nitride, magnesium nitride, titanium nitride, silicon nitride, chromium nitride, hafnium nitride, zirconium nitride, tantalum nitride, molybdenum nitride, niobium nitride, vanadium nitride and the like; oxides, such as aluminum oxide, titanium oxide, magnesium oxide, chromium oxide, yttrium oxide, zirconium oxide and the like; borides, such as titanium boride, zirconium boride, hafnium boride, tungsten boride, tantalum boride, chromium boride, molybdenum boride and the like; carbides, such as titanium carbide, boron carbide, chromium carbide, silicon carbide, hafnium carbide, zirconium carbide, vanadium carbide, tungsten carbide, niobium carbide, tantalum carbide and the like; and their mixtures and solid solutions, with at least one metal selected from the group consisting of first group metals, such as nickel, cobalt, chromium, manganese, iron and the like; second group metals, such as molybdenum, tungsten, vanadium and the like; and third group metals, such as aluminum, magnesium, silicon, titanium, zirconium, hafnium and the like.

The first group metal acts mainly to bond the high density boron nitride with the ceramic material. The second group metal acts to bond the high density boron nitride with the ceramic material similarly to the first group metal, and further acts to prevent the formation of coarse crystal grains of bonded metal and to improve the strength of the resulting composite sintered compact at high temperature. The third group metal has a high affinity to the high density boron nitride and improves the wettability of the high density boron nitride with the metal to produce effectively strong composite sintered compacts.

According to the present invention, a powdery mixture of W-BN, Z-BN, ceramic material and metal is sintered under a high-pressure and high-temperature condition to produce a composite sintered compact. In this sintering, the pressure and temperature are set to a condition, under which W-BN is not substantially converted into Z-BN. The conversion pressure and temperature are varied depending upon the kind of ceramic material and metal used in combination with high density boron nitride. However, in order to suppress reverse conversion of high density boron nitrides into g-BN and to drive practically effectively a very high-pressure apparatus, the sintering is advantageously carried out under a condition of a pressure of 4–7 GPa (40–70 Kbar) and a temperature of 1,200°–1,800° C.

Figure 1:
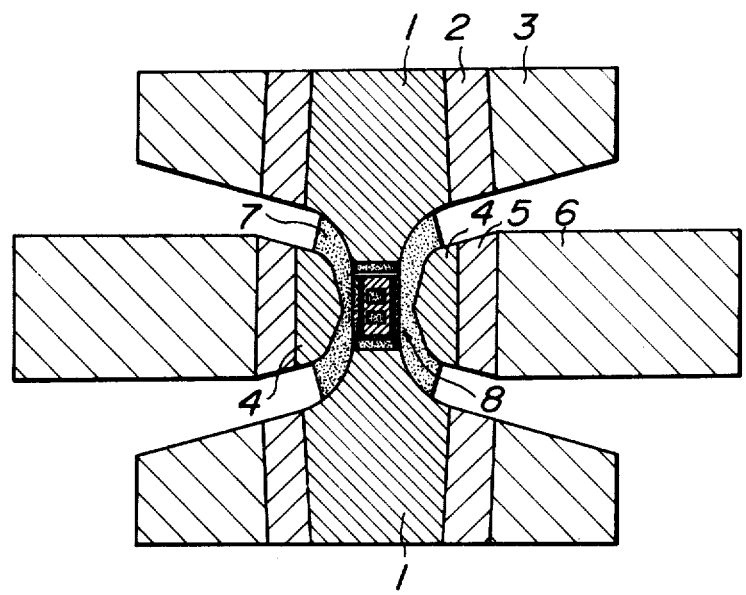
FIG. 1 is a cross-sectional view of an embodiment of a high-temperature and high-pressure apparatus used for the production of the composite sintered compact of the present invention.
Figure 2:
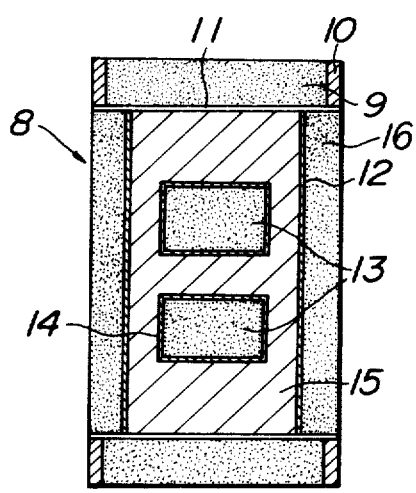
FIG. 2 is an enlarged cross-sectional view of the sample assembly shown in FIG. 1.

Any known very high-pressure apparatus can be used in the present invention, and a belt-type high-temperature and high-pressure apparatus illustrated in FIG. 1 is advantageously used. FIG. 1 is a cross-sectional view of one embodiment of the belt-type high-temperature and high-pressure apparatus used in the production of the composite sintered compact of the present invention. The numeral 1 represents an anvil core. The numerals 2 and 3 represent an anvil sleeve and an anvil case respectively, which are made of high-strength steel or die steel. The numeral 4 represents a cylinder core made of cemented carbide. The numerals 5 and 6 represent a cylinder sleeve and a cylinder case respectively, which are made of high-strength steel or die steel. The numeral 7 represents a gasket made of pyroferrite. The numeral 8 represents a sample assembly. FIG. 2 is an enlarged cross-sectional view of the sample assembly 8 shown in FIG. 1. In FIG. 2, the numeral 9 represents a filler made of pyroferrite and filled in an electroconductive ring 10, made of stainless steel. The numeral 11 represents an electroconductive disc made of molybdenum. The numeral 12 represents a cylindrical heater made of graphite. The numeral 13 represents raw stock powders for sintering, which have been placed in a molybdenum capsule 14. The numeral 15 represents low density boron nitride used for transmitting pressure, and the numeral 16 represents a sleeve made of pyroferrite.

In the conventional methods, a pressure of not less than 5.5 GPa (55 Kbar) has generally been required in order to obtain a dense sintered compact consisting mainly of W-BN. However, when (high density boron nitride containing W-BN and Z-BN)-(cermet) system raw stock is used, a sintered compact having a high compression strength is obtained even when the raw stock is sintered under a mild condition of a pressure of about 4 GPa (40 Kbar) and a temperature of 1,200° C.

When it is intended to produce a composite sintered compact from a mixture obtained by adding Z-BN crystal grains to raw material powders consisting of W-BN, ceramic material and metal, if the amount of the Z-BN crystal grains is not larger than 10% by volume based on the total amount of the mixture, the Vickers hardness of the resulting composite sintered compact is not substantially higher than that of a sintered compact produced from the raw material powders consisting of W-BN, ceramic material and metal only, and is about 2,500 kg/mm². This Vickers hardness is 500–1,000 kg/mm² lower than that of the above described Z-BN sintered compact tool sold in the market and having a high hardness. However, the cutting performance of the above obtained composite sintered compact is not inferior to that of the Z-BN sintered compact. The fact that the Vickers hardness of the composite sintered compact is 500–1,000 kg/mm² lower than that of the Z-BN sintered compact having a high hardness means that the composite sintered product can be worked more easily than the Z-BN sintered compact. Indeed, the composite sintered compact was able to be cut in a relatively short period of time even by means of ultrasonic cutting. Nevertheless, the composite sintered compact has a low flank abrasion in the cutting test for other substances and has a high abrasion resistance.

Accordingly, the composite sintered compact of the present invention has a sufficiently high hardness and a high abrasion resistance and further can be easily worked into cutting tools. Therefore, the composite sintered compact is useful as a material for cutting tools used in the cutting of substances which do not require a cutting tool having a particularly high hardness in the cutting, and is very valuable in industry.

Moreover, the method of producing the composite sintered compact in the present invention can be advantageously carried out under a relatively low pressure.

The following examples are given for the purpose of illustration of this invention and are not intended as limitations thereof. In the examples, "%" means % by volume unless otherwise indicated.

EXAMPLE 1

W-BN having an average grain size of 1 μm and Z-BN having an average grain size of 8 μm were mixed in a mixing ratio of 85% of the W-BN to 15% of the Z-BN in wet state in ethyl ether to produce high density boron nitride raw material powders. Cermet raw material powders were produced by mixing 60% of titanium nitride powders, 30% of aluminum nitride powders, 8% of nickel powders and 2% of molybdenum powders in wet state in ethyl ether. Both the raw material powders are mixed in a mixing ratio of 50% of the high density boron nitride raw material powders to 50% of the cermet raw material powders in wet state in ethyl ether to produce raw stock powders for sintering. The raw stock powders were press molded into a disc having a thickness of 2 mm and a diameter of 10 mm, the molded article was sealed in a capsule made of molybdenum plate of 0.5 mm thickness and having a shape corresponding to the dimension of the molded article, and the capsule was placed in a sample assembly 8 illustrated in FIG. 2. The sample assembly 8 was placed in the interior of a cylinder core 4 (inner diameter: 28 mm) of a belt type high-temperature and high pressure apparatus illustrated in FIG. 1. The sample assembly 8 was subjected to a pressure of 5 GPa (50 Kbar) by applying a pressure to the upper and lower anvils 1 and 1, and at the same time the sample assembly 8 was heated at 1,300° C. by supplying an electric current to a cylindrical heater 12. This pressure and temperature condition was maintained for 15 minutes. Then, the electric current was interrupted, the pressure removed, and the capsule was taken out from the sample assembly. Molybdenum, by which the capsule wall was formed, was removed from the capsule by grinding the molybdenum with a silicon carbide grinding stone, whereby a disc-shaped composite sintered compact according to the present invention was obtained. The surface of the resulting composite sintered compact had a Vickers hardness (load: 1 kg) of 2,530 kg/mm². The X-ray diffractiometry of the composite sintered compact showed that there was no conversion of W-BN into Z-BN. Then, the composite sintered compact was cut into halves by means of an ultrasonic cutting machine, which used diamond abrasive grains having an average grain size of 5 μm and delivered an output of 1 KW. For this cutting, 5 minutes were required. The resulting half disc-shaped composite sintered compact was further cut into halves in the same manner as described above, and the resulting one fourth disc-shaped composite sintered compact was ground by means of a diamond grinding stone to obtain a one fourth disc-shaped cutting tip. This cutting tip was stuck to a steel shank by brazing, and the tip was subject to a cutting test. In the cutting test, an SKD 61 steel, previously heat treated to a Rockwell hardness C scale 58, was cut in wet state by the tip under a condition of a peripheral speed of 117 m/min, a depth of 0.5 mm and a feed of 0.11 mm/rev. As the results, this composite sintered compact showed a flank abrasion of 0.30 mm in the cutting for 20 minutes, and was found to be commercially and practically usuable.

EXAMPLE 2

The same W-BN as used in Example 1 was mixed with Z-BN having an average grain size of 1.5 μm in wet state in a mixing ratio of 90% of the W-BN to 10% of the Z-BN to produce high density boron nitride raw material powders. Cermet raw material powders were produced by mixing in wet state 70% of titanium boride powders, 15% of silicon carbide powders, 10% of aluminum nitride powders and 5% of nickel powders. Both the raw material powders were mixed in dry state for 100 hours in a mixing ratio of 40% of the high density boron nitride raw material powders to 60% of the cermet raw material powders to produce raw stock powders for sintering. The raw stock powders were sintered in the same manner as described in Example 1 to obtain the desired disc-shaped composite sintered compact, which had a Vickers hardness (load: 1 kg) of 2,480 kg/mm$^2$.

The X-ray diffractiometry of the resulting composite sintered compact showed that there was no conversion of W-BN into Z-BN. When the resulting composite sintered compact was cut into halves by an ultrasonic cutting in the same manner as described in Example 1, four minutes were required in the cutting. Further, when a cutting tip was produced from the composite sintered compact and a cutting test was carried out in the same manners as described in Example 1, the composite sintered compact showed a flank abrasion of 0.35 mm in the cutting for 20 minutes.

EXAMPLE 3

The same raw stock powders for sintering, obtained in the same compounding recipe and same method as described in Example 2, were sintered under the same condition as described in Example 1, except that the pressure was varied to 6 GPa (60 Kbar) and the temperature was varied to 1,500° C., to produce the desired disc-shaped composite sintered compact, which had a Vickers hardness (load: 1 kg) of 2,550 kg/mm$^2$. The X-ray diffractiometry of the resulting composite sintered compact showed that there was no conversion of W-BN into Z-BN.

When the composite sintered compact was cut into halves by an ultrasonic cutting in the same manner as described in Example 1, five minutes were required in the cutting. Further, when a cutting tip was produced from the composite sintered compact and a cutting test was carried out in the same manners as described in Example 1, the composite sintered compact showed a flank abrasion of 0.30 mm in the cutting for 20 minutes.

EXAMPLE 4

The same W-BN and Z-BN as used in Example 1 were mixed in dry state in a mixing ratio of 85% of the W-BN to 15% of the Z-BN to produce high density boron nitride raw material powders. Cermet raw material powders were produced by mixing in dry state 35% of hafnium carbide powders, 45% of hafnium boride powders, 10% of hafnium powders, 4% of nickel powders, 3% of vanadium powders and 3% of aluminum powders. Both the raw material powders were mixed in dry state for 100 hours in a mixing ratio of 30% of the high density boron nitride raw material powders to 70% of the cermet raw material powders to produce raw stock powders for sintering. The raw stock powders were sintered in the same manner as described in Example 1, except that the pressure was varied to 5.5 GPa, (55 Kbar) to produce the desired disc-shaped composite sintered compact.

The resulting composite sintered compact had a Vickers hardness (load: 1 kg) of 2,500 kg/mm$^2$. The X-ray diffractiometry of the composite sintered compact showed that there was no conversion of W-BN into Z-BN. When the composite sintered compact was cut into halves by an ultrasonic cutting in the same manner as described in Example 1, four minutes were required in the cutting. Further, when a cutting tip was produced from the composite sintered compact and a cutting test was carried out in the same manners as described in Example 1, the composite sintered compact showed a flank abrasion of 0.35 mm in the cutting for 20 minutes.

EXAMPLE 5

High density boron nitride raw material powders were produced in the same manner as described in Example 4. Cermet raw material powders were produced by mixing in dry state 70% of silicon nitride powders, 10% of aluminum nitride powders, 7% of yttrium oxide powders, 5% of aluminum powders, 5% of silicon powders and 3% of tungsten powders. Both the raw material powders were mixed in dry state for 100 hours in a mixing ratio of 60% of the high density boron nitride raw material powders to 40% of the cermet raw material powders to produce raw stock powders for sintering. The raw stock powders were sintered in the same manner as described in Example 4 to produce the desired disc-shaped composite sintered compact, which had a Vickers hardness (load: 1 kg) of 2,680 kg/mm$^2$. The X-ray diffractiometry of the resulting composite sintered compact showed that there was no conversion of W-BN into Z-BN.

When the resulting composite sintered compact was cut into halves by an ultrasonic cutting in the same manner as described in Example 1, six minutes were required in the cutting. Further, when a cutting tip was produced from the composite sintered compact and a cutting test was carried out in the same manners as described in Example 1, the composite sintered compact showed a flank abrasion of 0.25 mm in the cutting for 20 minutes.

What is claimed is:

1. A composite sintered compact consisting of 15-60% by volume of high density boron nitride and the remainder being a cermet, said high density boron nitride consisting of 4-16% by volume of zincblende-type boron nitride and 96-84% by volume of wurtzite-type boron nitride, and said cermet consisting of 70-95% by volume of at least one ceramic material selected from the group consisting of aluminum nitride, magnesium nitride, titanium nitride, silicon nitride, chromium nitride, hafnium nitride, zirconium nitride, tantalum nitride, molybdenum nitride, niobium nitride, vanadium nitride, aluminum oxide, yttrium oxide, zirconium oxide, titanium boride, zirconium boride, hafnium boride, tungsten boride, tantalum boride, chromium boride, molybdenum boride, titanium carbide, boron carbide, chromium carbide, silicon carbide, hafnium carbide, zirconium carbide, vanadium carbide, tungsten carbide, niobium carbide, tantalum carbide and mixtures and solid solutions thereof; and 30-5% by volume of at least one metal selected from the group consisting of nickel, cobalt, chromium, manganese, iron, molybdenum, tungsten, vanadium, aluminum, magnesium, silicon, titanium, zirconium and hafnium, said composite sintered compact having a Vickers hardness not higher than about 2,680 kg/mm$^2$.

2. A method of producing composite sintered compact, comprising mixing 15-60% by volume of high density boron nitride powders, which consist of 4-16% by volume of zincblende-type boron nitride powders and 96-84% by volume of wurtzite-type boron nitride powders, with 85-40% by volume of cermet powders, which consists of 70-95% by volume of at least one ceramic material powder selected from the group consisting of aluminum nitride, magnesium nitride, titanium nitride, silicon nitride, chromium nitride, hafnium nitride, zirconium nitride, tantalum nitride, molybdenum nitride, niobium nitride, vanadium nitride, aluminum oxide, yttrium oxide, zirconium oxide, titanium boride, zirconium boride, hafnium boride, tungsten boride, tantalum boride, chromium boride, molybdenum boride, titanium carbide, boron carbide, chromium carbide, silicon carbide, hafnium carbide, zirconium carbide, vanadium carbide, tungsten carbide, niobium carbide, tantalum carbide and mixtures and solid solutions thereof; and 30-5% by volume of at least one metal powder selected from the group consisting of nickel, cobalt, chromium, maganese, iron, molybdenum, tungsten, vanadium, aluminum, magnesium, silicon, titanium, zirconium, and hafnium, and sintering the resulting mixture under a condition of a pressure of 4-5.5 GPa and a temperature of 1,200°-1,800° C., whereby the wurtzite-type boron nitride is not substantially converted into zincblende-type boron nitride.

* * * * *